United States Patent [19]

Chen

[11] Patent Number: 5,068,030
[45] Date of Patent: Nov. 26, 1991

[54] WATER FILTERING STERILIZING AND HEATING APPARATUS

[75] Inventor: Chi-Min Chen, Taipei Hsien, Taiwan

[73] Assignee: Oxford Science Industrial Co., Ltd., Taipei Hsien, Taiwan

[21] Appl. No.: 611,049

[22] Filed: Nov. 9, 1990

[51] Int. Cl.⁵ ............... B01D 35/143; B01D 35/06; C02F 9/00

[52] U.S. Cl. ........................... 210/95; 210/104; 210/127; 210/128; 210/149; 210/181; 210/182; 210/223; 210/243; 210/259; 210/266; 210/282; 210/287; 210/748; 422/21; 422/24

[58] Field of Search ............ 210/748, 259, 94, 95, 210/742, 266, 282, 287, 127, 128, 104, 149, 181, 182, 223, 243; 422/20, 21, 24, 186.3, 187, 211

[56] References Cited

U.S. PATENT DOCUMENTS

| | | | |
|---|---|---|---|
| 3,630,377 | 12/1971 | Brooks | 210/262 |
| 4,013,552 | 3/1977 | Kreuter | 210/748 |
| 4,582,629 | 4/1986 | Wolf | 210/748 |
| 4,728,368 | 3/1988 | Pedziwiate | 210/748 |
| 4,740,296 | 4/1988 | Roman | 210/94 |
| 4,769,131 | 9/1988 | Noll et al. | 210/748 |
| 4,770,768 | 9/1988 | Lang | 210/94 |
| 4,798,702 | 1/1989 | Tucker | 210/748 |
| 4,857,204 | 8/1989 | Joklik | 210/748 |
| 4,865,749 | 9/1989 | Yoshida | 210/742 |
| 4,893,422 | 1/1990 | Mahlich et al. | 210/94 |
| 4,968,437 | 11/1990 | Noll et al. | 210/748 |

Primary Examiner—Stanley S. Silverman
Assistant Examiner—Cynthia L. Nessler
Attorney, Agent, or Firm—Morton J. Rosenberg; David I. Klein

[57] ABSTRACT

A water filtering, sterilizing and heating apparatus is provided. The apparatus includes filter tank provided with activated carbon therein, to filter bacteria, miscellaneous impurities and odor in water. The output of the filter is coupled to a microwave oscillator to vibrate and churn the water coming from the filter tank. The water from the microwave oscillator is coupled to an ultraviolet light sterilizing tank having an ultraviolet lamp disposed vertically in the center thereof. A storage tank is provided to receive and store the water coming from the ultraviolet light sterilzing tank. The fluid level in the storage tank is maintained by automatically controlling the passage of water thereto by means of an electromagnetic valve actuated by a micro switch responsive to displacement of a float. The temperature of the stored water being kept at a preset temperature by means of a heater and a temperature sensor.

5 Claims, 6 Drawing Sheets

WATER FILTERING STERILIZING AND HEATING APPARATUS

BACKGROUND OF THE INVENTION

Water has been deteriorating by pollution as industries have developed. Water in rivers or lakes have gradually been polluted by waste material, especially toxic metals or chemicals, coming from chemical or metal treating factories. Although tap water used by common people is purified by several process, such as settling, filtering, disinfecting, chlorinating, and the like, it may still contain micro bacteria and invisible miscellaneous tiny impurities, so that it is unsuitable for drinking without boiling. Additionally, bacteria, miscellaneous impurities and chlorides may be consumed with raw vegetables which have been washed in the contaminated tap water. When rice is cooked in a rice cooker, the chloride contained in the tap water mixed in with the rice can become chloroform, which is toxic and harmful to a human body. The chloroform can mix in the rice cooked in the water and is consumed together with the rice.

Tap water is considered to have the following disadvantages:

1. It still contains considerable amounts of micro bacteria and miscellaneous impurities, not suitable for washing raw vegetables or fruit.

2. It contains some chlorides, so it can detrimentally affect the health of people who eat rice cooked with it.

SUMMARY OF THE INVENTION

The water filtering, sterilizing and heating apparatus of the present invention comprises a filter tank, a microwave oscillator, an ultraviolet light sterilizing tank and a storage tank as the main components.

The filter tank contains activated carbon for filtering bacteria, miscellaneous impurities and odor in the water.

The microwave oscillator includes a water tube passing through its interior through which the water coming from the filter tank flows. The water passing therethrough receives the super high frequency produced by the oscillator, causing it to be vibrated and churned.

The ultraviolet light sterilizing tank includes an ultraviolet lamp diposed vertically in the center of the cylindrical sterilizing tank. A curved wave-generating board is fixed at the bottom of the tank, and a water inlet coupled through the tank wall is positioned to face the board. A helical projecting ridge is disposed around the inner circumferential surface of the tank. The water coming from the microwave oscillator flows through the inlet moving along the wave-generating board and then along the helical ridge, being sterilized by the light produced from the ultraviolet lamp as it flows.

The storage tank is provided to receive and to store the water coming from the ultraviolet sterilizing tank. The storage tank has an upper cover, a micro switch disposed on the upper cover, an electromagnetic valve connected in the flow path to the storage tank for controlling passage of water by actuation of the micro switch. An electric heater is located at the bottom of the storage tank, and a temperature sensor disposed on the inner surface thereof automatically turns "on" or "off" the switch of the heater, so that the water stored therein can be heated and kept at a predetermined temperature.

An outer housing for protecting those components includes a transparent window located in front of the filter tank, for checking the color of the water filtered in the tank, by comparison with a color standard disposed on the left side of the window. A user can then judge whether the filtered water has reached the filtering standard, and whether the activated carbon should be replaced.

The apparatus is provided with two supporters coupled by wing nuts at opposing lower sides of the outer housing for maintaining the apparatus above the ground.

The cool and the hot water faucets can each be disassembled from the outer housing and remotely located with a fixing plate set on any wall, by means of an elbow, a union tube fitting and tubing extended from the apparatus to the remote site.

DETAILED DESCRIPTION OF THE PREFERRED EMBODIMENTS

Figure 1:
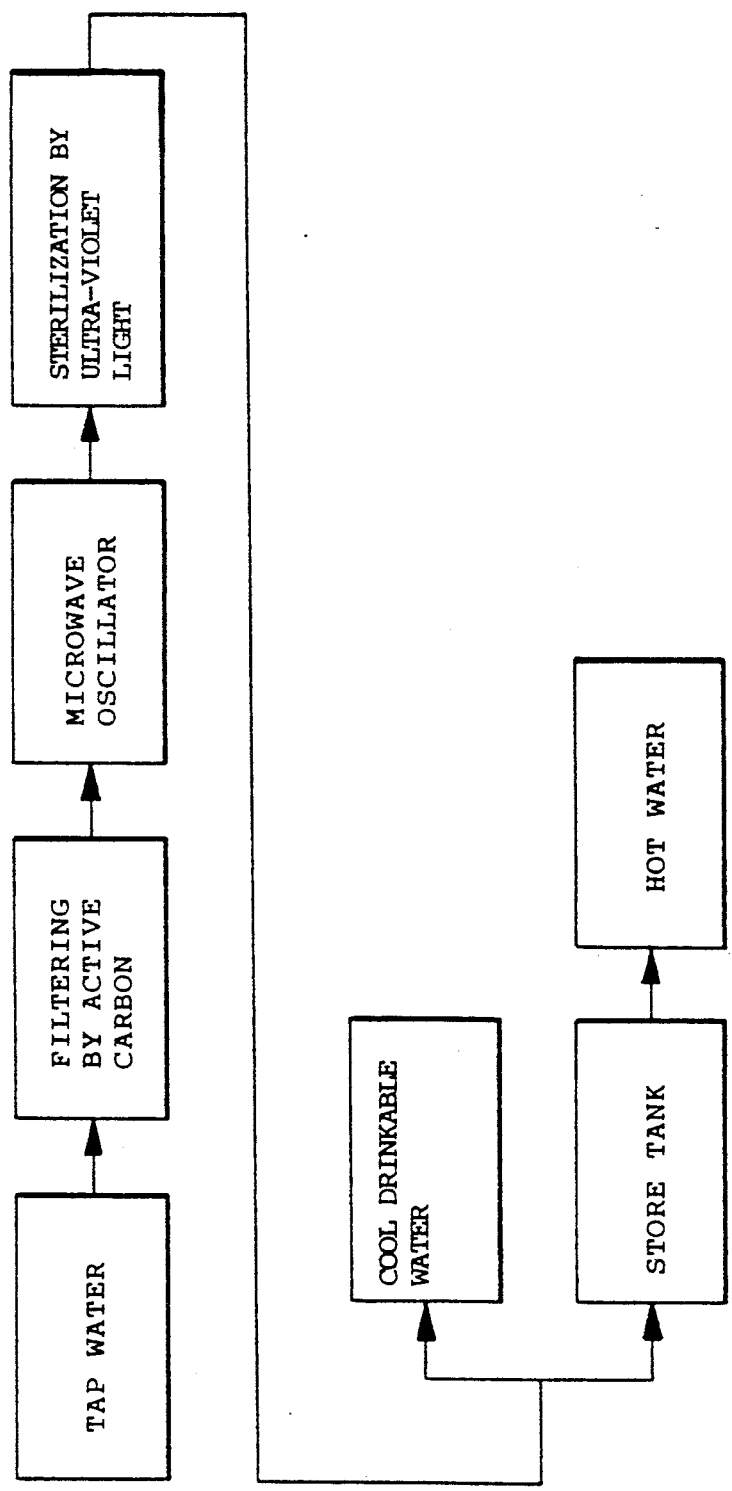
FIG. 1 is a flow chart of filtering, sterilizing and heating processes of the present invention.
Figure 2:
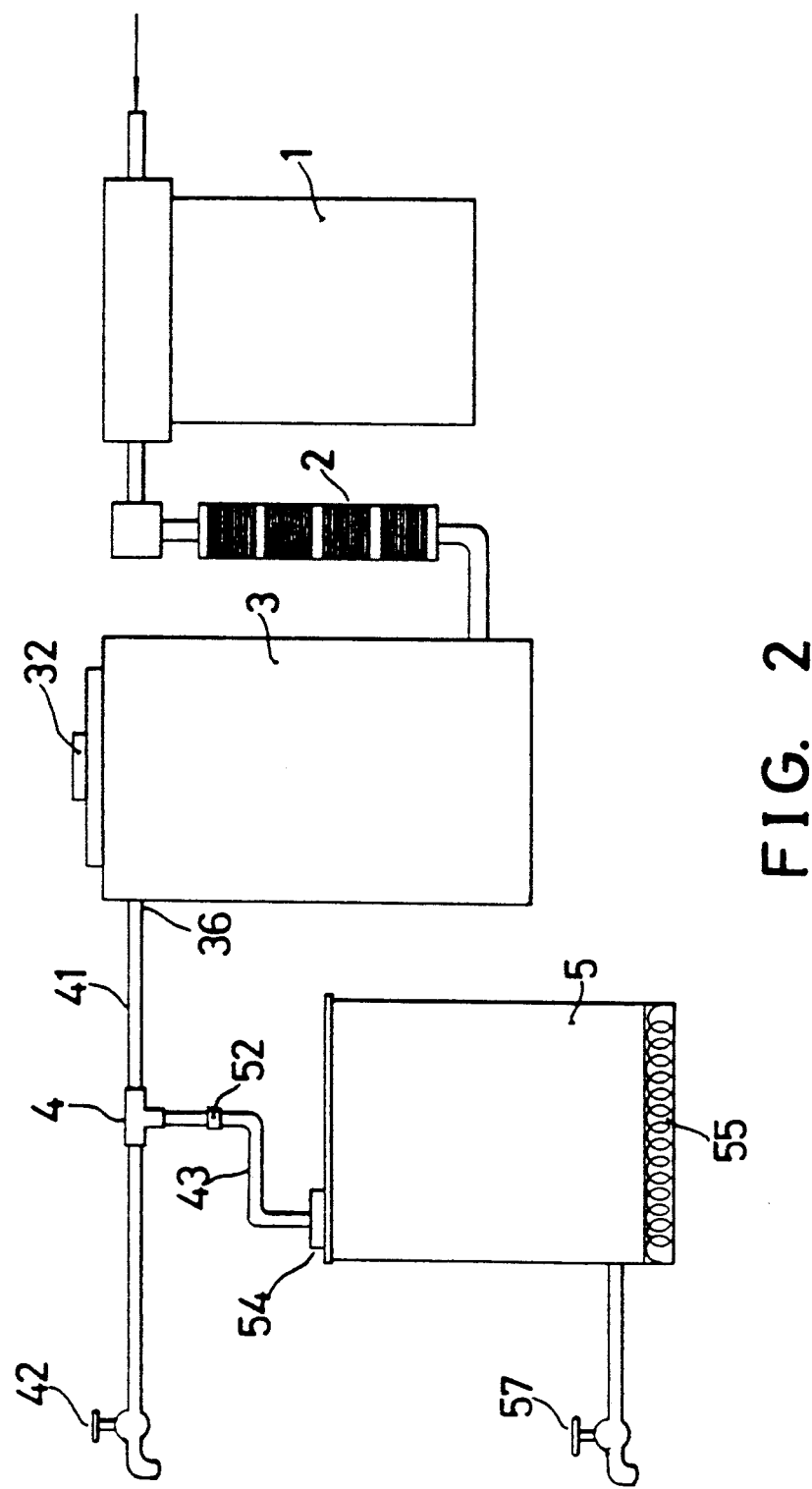
FIG. 2 is a diagram of the filtering, sterilizing and heating apparatus of the present invention.

As shown in FIGS. 1 and 2, the water filtering, sterilizing and heating apparatus comprises a filter tank 1, a microwave oscillator 2, an ultraviolet light sterilizing tank 3, and a storage tank 5, as the main components coupled together with water tubes.

The filter tank 1 has activated carbon in its interior to filter bacteria, miscellaneous impurities and odor in the water supplied from a tap water source by a tube.

The microwave oscillator 2 has a water tube passing through its interior. The water coming from the filter tank 1 flows down through the unit 2, to be subjected to the frequency produced thereby, so that the water can be vibrated and churned.

Figure 4:
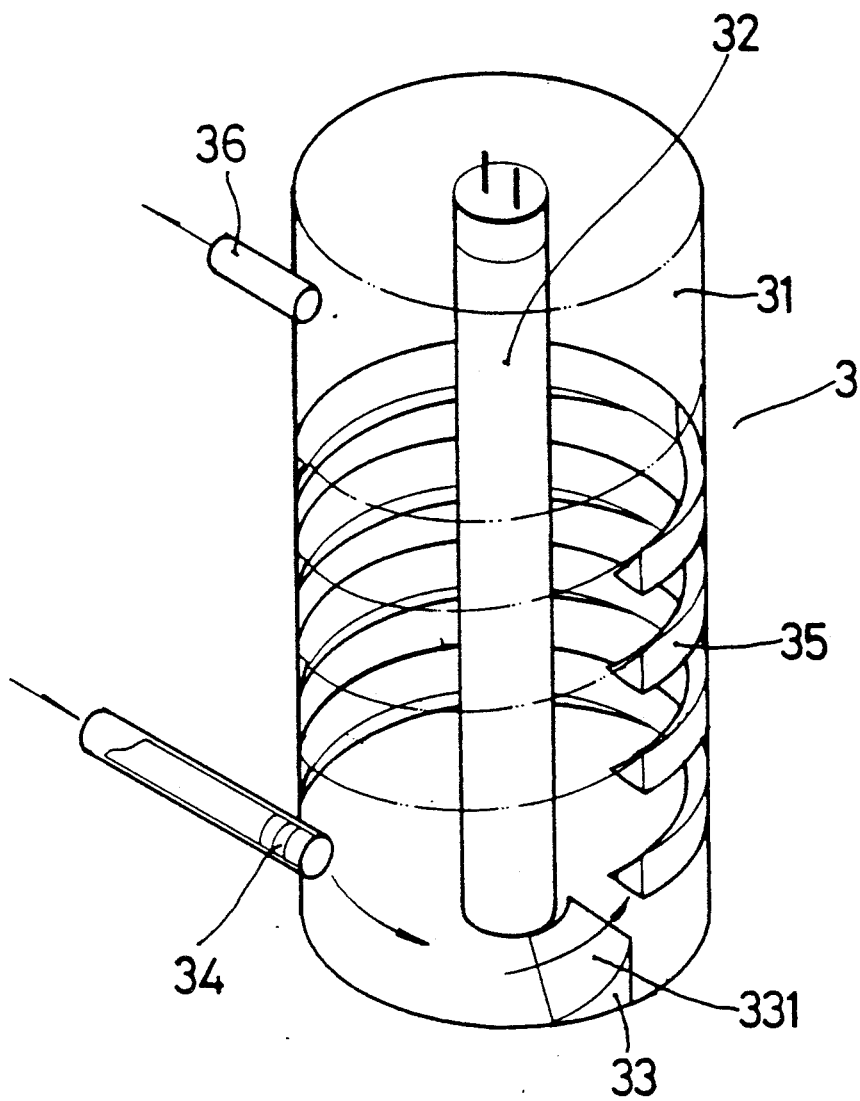
FIG. 4 is a perspective schematic view of the ultraviolet sterilizing tank of the present invention.

As shown in FIG. 4, the ultraviolet light sterilizing tank 3 comprises a cylindrical tank 31 having an ultraviolet lamp 32 fixed vertically in the center thereof. A curved wave-generating board 33 having a curved upper surface 331 is coupled to the bottom of the tank near the circumferential wall, and a water inlet 34 set through the circumferential wall of the tank faces the wave-generating board 33. A spiral or helical ridge 35 is disposed around the inner circumferential surface of the tank. The water coming from the microwave oscillator 2 goes through the inlet 34, flows along the wave-generating board surface 331, and then along the helical ridge 35. The water is sterilized by the light produced by the ultraviolet lamp 32 as it flows through the tank, before flowing out of an outlet 36.

The outlet 36 is connected to a Tee fitting 4 by a tube 41. The Tee fitting 4 is connected to both a cool water faucet 42 and a tube 43 leading to the storage tank 5.

Figure 5:
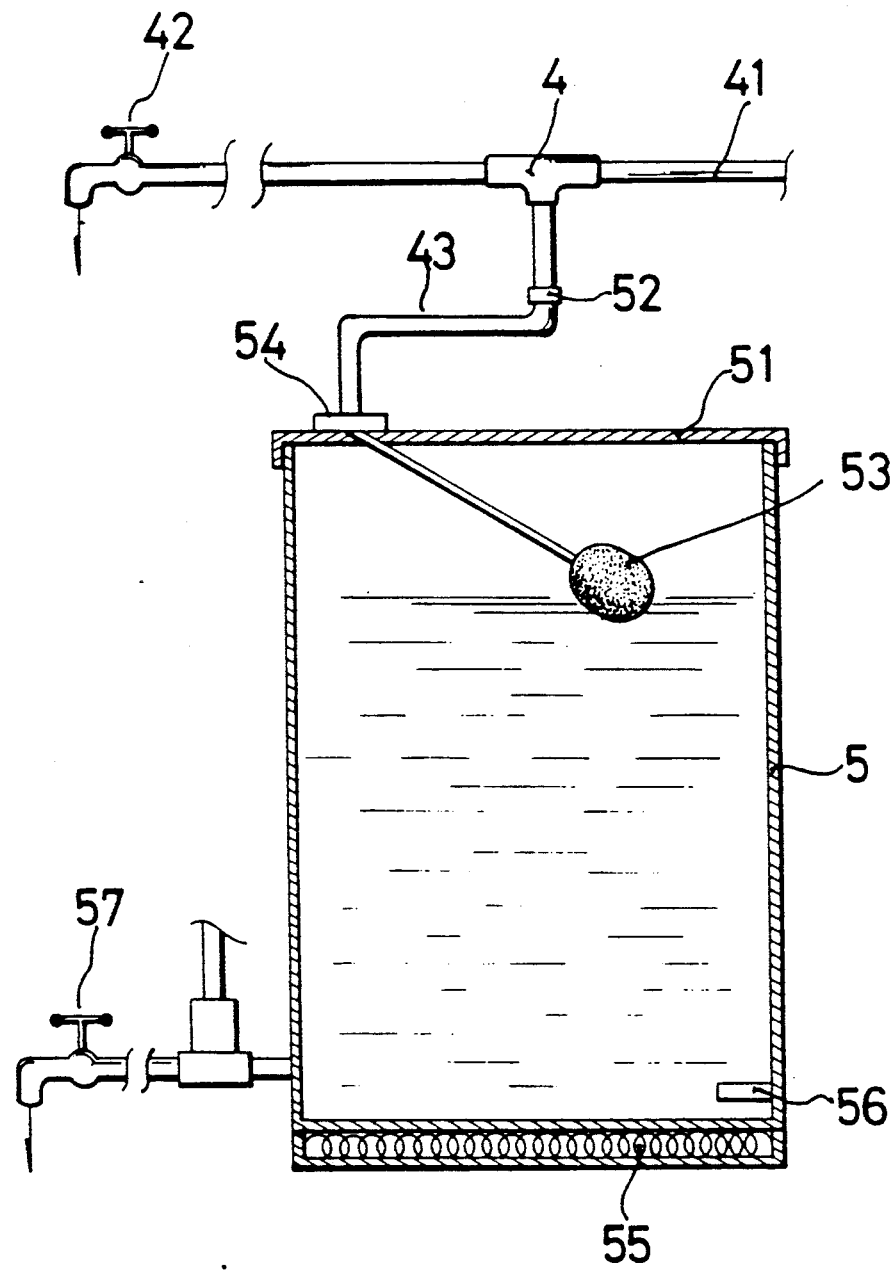
FIG. 5 is a cross-sectional view of the storage tank of the present invention; and, FIG. 6 is a partly exploded perspective view of the filtering, sterilizing and heating apparatus of the present invention.

The storage tank 5, shown in FIGS. 2 and 5, stores the water coming from the ultraviolet light sterilizing tank 3. Storage tank 5 includes an upper cover 51, a micro switch 54 coupled to the cover 51, an electromagnetic valve 52 for controlling the flow of water to tank 5, is disposed in the fluid line between the tube 43 and the micro switch 54. The valve is actuated by the switch 54 responsive to displacement of a flaot 53, located inside the storage tank 5. An electric heater 55 is provided at the bottom of storage tank 5, and a temperature sensor 56 positioned on the inner surface of the tank, in a predetermined location automatically turns "on" or "off" the switch for the heater 55. A hot water faucet 57 is located near the outer surface of an outer housing for the apparatus. Thus, the height of the hot water in the storage tank 5 can be automatically maintained by the float 53 which operates the micro switch 54 and the electromagnetic valve 52 thereby. The temperature to which the hot water is heated by the heater 55 can be automatically controlled by the temperature sensor 56 which actuates the switch for the heater 55. The stored hot water can be drawn out of the hot water faucet 57 for use.

Figure 3:
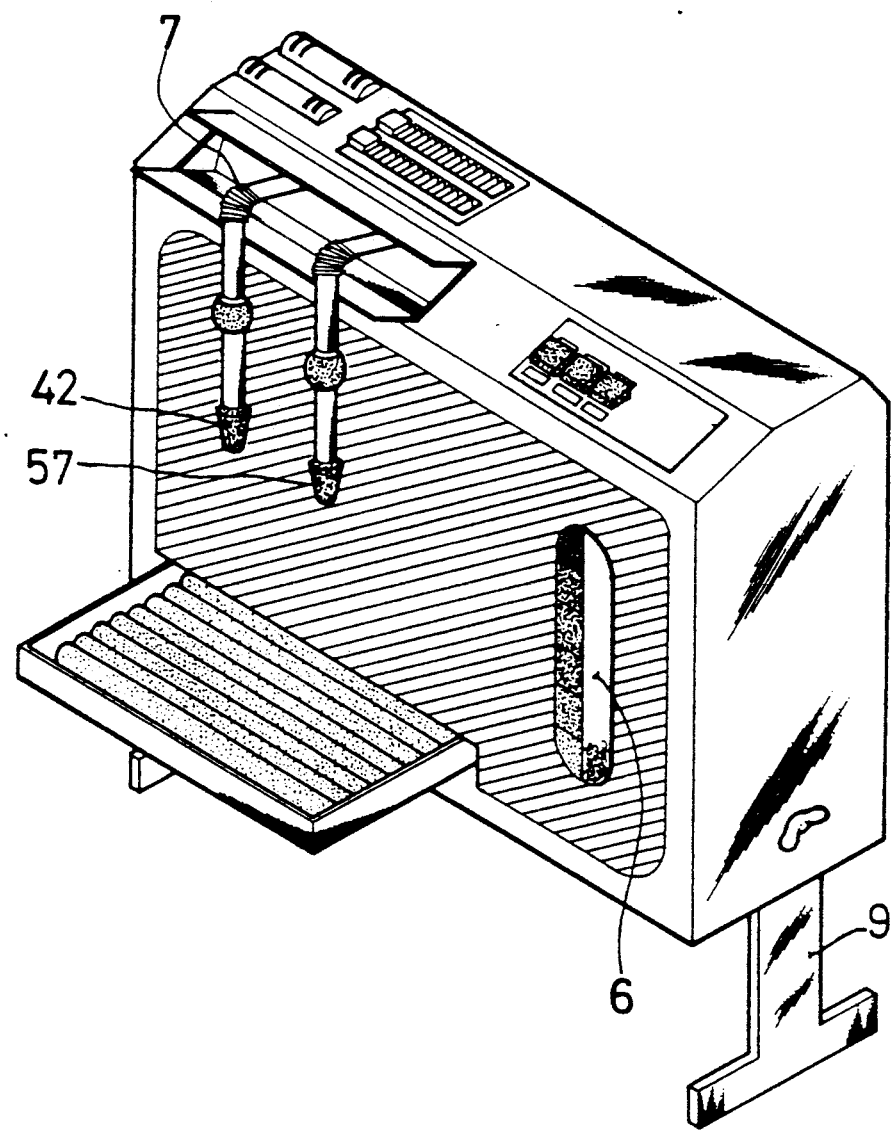
FIG. 3 is a perspective view of an outer housing for protecting the whole apparatus of the present invention.
Figure 6:
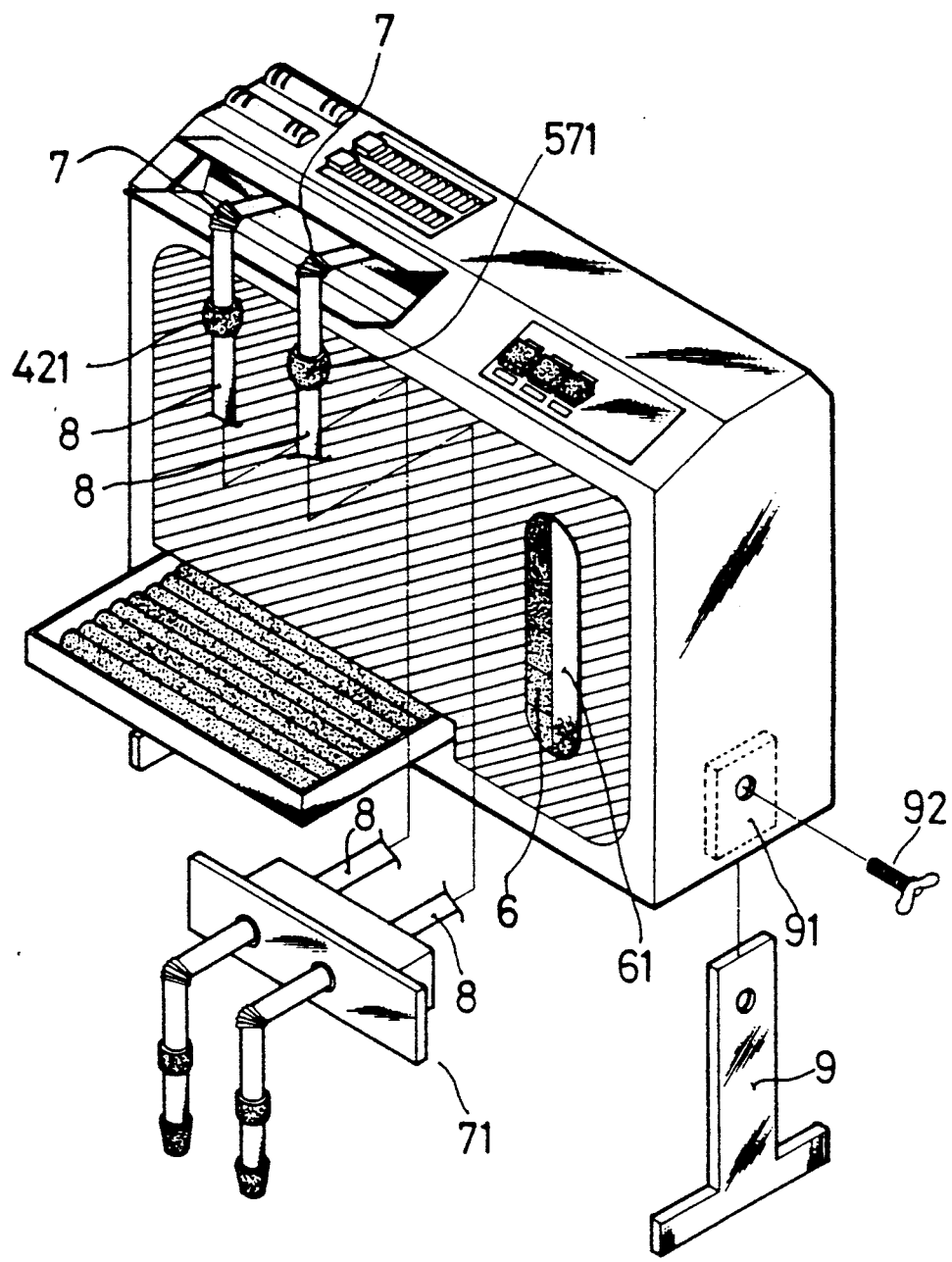

Referring to FIGS. 3 and 6, there is shown, an outer housing for the whole apparatus having a window 6 overlaying the filter tank 1. The window 6 allows the color of the water in the filter tank 1 to be checked by comparing the color standard disposed on the left side of the window with the transparent right side of the window 6. The color standard is vertically arranged with divisions of different color density standards, the uppermost being the deepest and the lowest being the palest. The color seen through the right side is the color of the water filtered by the activated carbon, and a user can compare that color with the standard, and decide whether the filtered water has reached the level of the present standard of filteration, and whether the activated carbon should be replaced.

Two elbow tube fittings 7 are provided at the upper left portion of the outer housing, connected respectively with the water tube 41 and the storage tank 5 for coupling with the cool water faucet 42 and the hot water faucet 57, respectively, by means of union tube fittings 421, 571, as shown in FIG. 3. In case both fuacets 42, 57 are not needed to be directly coupled on the outer housing, two tubes 8 are connected to the elbow tube fittings 7 through a fixing plate 71, fixed on any wall or the like. Then both faucets 42, 57 can be connected with the tubes 8 by means of the union tube fittings 421, 571. If desired, the whole apparatus can be raised above the ground. Two supports 9 can be used to support the apparatus, the supports 9 are each secured to opposing sides of the outer housing by a respective winged bolt 92. The bolts 92, are each threaded into respective threaded through openings 91 of the outer housing.

In general, this apparatus has been designed to have the following advantages:

1. The treated water from this apparatus can be consumed directly without the necessity of boiling.

2. The apparatus can be connected to a tap water line to receive water automatically without the necessity of manually filling the device.

3. The transparent filter tank is visible through a window in the outer housing to permit the user to check if the water in the filter tank is filtered to the pre-set standard. The different color density standards printed on the window serve in aiding the user to determined when to replace activated carbon in the filter tank.

4. The water treated with this apparatus can be helpful for users' health, as elements leading to cancer, bacteria, harmful miscellaneous impurities and odor can be eliminated by this apparatus.

What is claimed is:

1. A water filtering, sterilizing and heating apparatus for coupling to a source of tap water, comprising:
    a housing;
    a filter tank disposed within said housing coupled to said source of water, said filter tank including activated carbon for removing odors and impurities from water passing therethrough;
    a microwave oscillator disposed within said housing having an inlet coupled to an outlet of said filter tank for vibrating and churning water passing therethrough;
    a vertically directed sterilizing tank disposed within said housing having a cylindrically shaped outer wall and an inlet disposed at a lower portion of said sterilizing tank, said sterilizing tank inlet being coupled to an outlet of said microwave oscillator, said sterilizing tank including (1) an ultra-violet lamp positionally located centrally therein and extending in said vertical direction, (2) a ridge member helically formed on in inner surface of said outer wall for directing the flow of water through said sterilizing tank to an outlet disposed at an upper portion of said sterilizing tank, and (3) a deflection member disposed adjacent said inlet of said sterilizing tank for directing water entering said sterilizing tank to said helical ridge member, whereby water flowing through said sterilizing tank spirals about said ultra-violet lamp;
    cold water discharge means coupled to said outlet of said sterilizing tank for supplying substantially unheated water from said sterilizing tank, said cold water discharge means including a first faucet coupled to said outlet of said sterilizing tank; and,
    hot water discharge means coupled in parallel comunication with said cold water discharge means for supplying heated water from said sterilizing tank, said hot water discharge means including (1) a storage tank disposed within said housing being fluidly coupled to said outlet of said sterilizing tank, (2) valve means for controlling the flow of water into said storage tank responsive to a fluid level therein, (3) means for heating water within said storage tank to a predetermined temperature, and (4) a second faucet coupled to an outlet of said storage tank.

2. The filtering, sterilizing and heating apparatus as recited in claim 1 where said valve means includes (1) an electromagnetic valve fluidly coupled to said outlet of said sterilizing tank for controlling fluid flow to said storage tank, (2) a micro switch electrically coupled to said electromagnetic valve, and (3) a float coupled to said micro switch, whereby said micro switch operates said electromagnetic valve responsive to said float being displaced to a predetermined position by a change in water level within said storage tank.

3. The filtering, sterilizing and heating apparatus as recited in claim 1 where said heating means includes an electric heater controlled by a sensor coupled to an inner wall surface of said storage tank.

4. The filtering, sterilizing and heating apparatus as recited in claim 1 where said housing includes a transparent window for viewing said filter tank, said window having a color standard coupled thereto for comparison with filtered water in said filter tank.

5. The filtering, sterilizing and heating apparatus as recited in claim 1 further includes a pair of support members releasably coupled to said housing on opposing sides thereof.

* * * * *